United States Patent
Takahashi et al.

[11] Patent Number: 5,811,036
[45] Date of Patent: Sep. 22, 1998

[54] PROCESS FOR RECYCLING RESIN COVERED WITH PAINT FILM

[75] Inventors: Naoyuki Takahashi; Sadao Ikeda; Yoshio Taguchi; Narihito Tatsuda; Norio Sato; Kenzo Fukumori, all of Aichi-ken, Japan

[73] Assignees: Toyota Jidosha Kabushiki Kaisha; Kabushiki Kaisha Toyota Chuo Kenkyusho, both of Aichi-ken, Japan

[21] Appl. No.: 639,341

[22] Filed: Apr. 26, 1996

[30] Foreign Application Priority Data

Apr. 28, 1995 [JP] Japan .................................. 7-106589

[51] Int. Cl.$^6$ .............................. B29B 7/66; B29B 17/02
[52] U.S. Cl. .................. 264/37; 241/17; 241/23; 264/102; 264/211.21; 264/349; 264/DIG. 69; 425/DIG. 46
[58] Field of Search ..................... 264/102, 349, 264/211.21, DIG. 69, 37, 101; 425/DIG. 46, 203; 241/17, 23

[56] References Cited

U.S. PATENT DOCUMENTS

| | | | |
|---|---|---|---|
| 4,051,212 | 9/1977 | Grigat et al. | 264/102 |
| 4,324,705 | 4/1982 | Sato et al. | 521/44 |
| 5,286,424 | 2/1994 | Su et al. . | |
| 5,414,021 | 5/1995 | Eddy | 521/48 |
| 5,424,013 | 6/1995 | Lieberman | 264/102 |
| 5,443,772 | 8/1995 | Inoue et al. | 264/102 |
| 5,475,036 | 12/1995 | Hosoyama et al. . | |
| 5,476,624 | 12/1995 | Sato et al. | 264/83 |
| 5,539,004 | 7/1996 | Ikeda et al. . | |

FOREIGN PATENT DOCUMENTS

| | | |
|---|---|---|
| 0547249 A1 | 6/1993 | European Pat. Off. . |
| 0584501 A1 | 3/1994 | European Pat. Off. . |
| 5-200749 | 8/1993 | Japan . |
| 5-337940 | 12/1993 | Japan . |
| 6-23748 | 2/1994 | Japan . |
| 6-99433 | 4/1994 | Japan . |
| 6-198652 | 7/1994 | Japan . |
| 6-299107 | 10/1994 | Japan . |
| 7-108532 | 4/1995 | Japan . |

OTHER PUBLICATIONS

List of Prior Art Documents (2 pages) (Discussing Japenese patent publications).

Primary Examiner—Mathieu D. Vargot
Attorney, Agent, or Firm—Finnegan, Henderson, Farabow, Garrett & Dunner, L.L.P.

[57] ABSTRACT

A process for recycling a thermoplastic resin covered with a thermosetting-resin paint film includes the steps of decomposing the paint film by bringing the thermoplastic resin covered with the paint film into contact with a paint-film-decomposing agent in a molten state, and removing decomposed products, resulting from the paint film and the paint-film-decomposing agent, and the residual paint-film-decomposing agent by degassification to prepare a recycled resin. The paint-film-decomposing agent can be primary amines and/or secondary amines having a boiling point of 250° C. or less, or being decomposed at 250° C. or less, or can be tertiary amines and/or quaternary amines having a boiling point of 250° C. or less, or being decomposed at 250° C. or less to which water and/or alcohols is added.

24 Claims, 1 Drawing Sheet

PROCESS FOR RECYCLING RESIN COVERED WITH PAINT FILM

BACKGROUND OF THE INVENTION

1. Field of the Invention

The present invention relates to a process for recycling a resin covered with a thermosetting-resin paint film.

2. Description of the Related Art

Japanese Unexamined Patent Publication (KOKAI) No. 5-200,749 discloses one of conventional processes for recycling a thermoplastic resin covered with a thermosetting-resin paint film. In the publication, a polypropylene-based composite covered with a thermosetting-resin paint film is recycled, for example, by using a paint-film-decomposition-accelerating agent. The paint-film-decomposition-accelerating agent can be at least one member selected from the group consisting of Lewis acids like tin chloride, hydroxides of alkali metals, hydroxides of alkaline-earth metals, amines, alcoholates (or alkoxides), salts of metallic posphates, and diethanolamine. The paint-film-decomposition-accelerating agent is added in an amount of from 0.01 to 1% by weight with respect to the polypropylene-based composite in order to thermally degrade the thermosetting-resin paint film at 200° C. or more.

In the recycling process set forth in Japanese Unexamined Patent Publication (KOKAI) No. 5-200,749, the acids or allis working as the paint-film-decomposition-accelerating agent are employed as a catalyst in order to thermally degrade the thermosetting-resin paint film. However, the rate of the decomposition of the thermosetting-resin paint film is slow because the paint-film-decomposition-accelerating agent is added in an amount of 1% by weight or less. In addition, the paint-film-decomposition-accelerating agent remains in the recycled resin to deteriorate the qualities of the recycled resin. Thus, there arises a problem in that the recycled resin prepared by the recycling process is used in limited applications only.

Japanese Unexamined Patent Publication (KOKAI) No. 6-198,652 discloses another one of the conventional processes for recycling a painted plastics-molded product. This recycling process includes the steps of pulverizing a painted plastics-molded product; and melting and kneading pulverized pieces of the painted plastics-molded product with an inorganic or organic paint-film-decomposition-accelerating agent and water by a kneader. The inorganic or organic paint-film-decomposition-accelerating agent includes bismuth, lead or tin. The paint-film-decomposition-accelerating agent is added in an amount of from 0.001 to 3 parts by weight with respect to 100 parts by weight of the painted plastics-molded product, and the water is added in an amount of 0.5 to 50 parts by weight with respect thereto. The paint-film-decomposition-accelerating agent and water are brought into contact with the pulverized pieces of the painted plastics-molded product at a temperature of from 200° to 320° C. for a time period of from 0.5 to 5 minutes.

In the recycling process set forth in Japanese Unexamined Patent Publication (KOKAI) No. 6-198,652, bismuth, lead or tin remains in the recycled resin to limit the applications of the recycled resin. In addition, in the recycling process where the paint-film-decomposition-accelerating agent does not include bismuth, lead or tin, the paint film is decomposed at a poor decomposition efficiency.

Japanese Unexamined Patent Publication (KOKAI) No. 6-23,748 discloses still another one of the conventional processes for recycling a painted plastics-molded product. This recycling process includes the steps of pulverizing a painted plastics-molded product to prepare pulverized pieces having a predetermined size; charging the pulverized pieces into a screwed extruder; and charging water, an alkali aqueous solution or alcohol into the screwed extruder, and melting and kneading the pulverized pieces together with the water, alkali aqueous solution or alcohol while degassing decomposed gases resulting from the paint film and vaporized water, thereby preparing a recycled resin.

In the recycling process set forth in Japanese Unexamined Patent Publication (KOKAI) No. 6-23,748, allali compounds remain in the recycled resin to deteriorate the qualities of the recycled resin. In addition, there arises a problem in that the paint film is decomposed at a poor decomposition efficiency when the alkali aqueous solution is added in a suppressed amount.

Thus, the conventional recycling processes suffer from the problems in that they only decompose limited species of the thermosetting resins constituting the paint film, and in that they decompose the paint film at impractical decomposition efficiency. In addition, they associate with the problem in that the recycled resin is used only in limited applications because they use the paint-film-decomposition accelerating agents which remain in the recycled resin.

SUMMARY OF THE INVENTION

The present invention has been developed in view of the aforementioned circumstances. It is therefore an object of the present invention to provide a process for recycling a thermoplastic resin covered with a thermosetting-resin paint film. The recycling process according to the present invention can be applied to the decomposition of a wide variety of thermosetting resins constituting the paint film, and can decompose the thermosetting-resin paint film at a fast rate in a short period of time by carrying out kneading by using an extruder provided with a screw. The recycled resin prepared by the present recycling process is degraded less in terms of physical properties, and can be formed into molded products having good paintability.

In a first aspect of the present invention, the present recycling process comprises the steps of:

decomposing a paint film of a thermosetting resin by bringing 100 parts by weight of a thermoplastic resin covered with the paint film into contact with from 1.5 to 50 parts by weight of a paint-film-decomposing agent in a molten state, the paint-film-decomposing agent comprising at least one member selected from the group consisting of a primary amine and a secondary amine, the primary amine and secondary amine having a boiling point of 250° C. or less, or being decomposed at 250° C. or less; and then removing the decomposed paint film, and the paint-film-decomposing agent or the decomposed paint-film-decomposing agent by degassification, thereby preparing a recycled resin.

In a second aspect of a recycling process according to the present invention, the present recycling process comprises the steps of decomposing a paint film of a thermosetting resin by bringing 100 parts by weight of a thermoplastic resin covered with the paint film into contact with a paint-film-decomposing agent in a molten state, the paint-film-decomposing agent comprising 1.5 to 10 parts by weight of at least one member selected from the group consisting of a tertiary amine and a quaternary ammonium compound, the tertiary amine and quaternary ammonium compound having a boiling point of 250° C. or less, or being decomposed at 250° C. or less, and 0.5 to 40 parts by weight of at least one member selected from the group consisting of water and an alcohol; and then removing the decomposed paint film, and the paint-film-decomposing agent or the decomposed paint-film-decomposing agent by degassification, thereby preparing a recycled resin.

The first and second aspects of the present invention will be hereinafter described.

In the first aspect of the present invention, at least one amine selected from the group consisting of primary amines and secondary amines is employed as the paint-film-decomposing agent. The paint film includes a thermosetting resin, and is thermally decomposed by an aminolysis reaction of the amine working as the paint-film-decomposing agent.

In the second aspect of the present invention, the paint-film-decomposing agent comprises at least one selected from the group consisting of tertiary amines and quaternary ammonium compounds, and at least one selected from the group consisting of water and alcohols. Note that, in the second aspect, the tertiary amines and/or quaternary ammonium compounds work as a nucleophilic catalyst, and simultaneously eliminate hydrogen atoms from the hydroxide groups of water and/or the alcohols. Thus, the paint-film-decomposing agent produces alkoxides which are highly reactive to the paint film. As a result, the paint-film-decomposing agent facilitates the decomposition of the paint film by means of alcoholysis and/or hydrolysis reaction.

The decomposed products, resulting from the paint film and the paint-film-decomposing agent, and the residual paint-film-decomposing agent can be removed by degassification in the following manner; namely: the decomposed products and the residual paint-film-decomposing agent are heated to a temperature of their boiling points or more, thereby evaporating the decomposed products and the residual paint-film-decomposing agent. Thus, the thermoplastic resin can be isolated. When removing the decomposed products and the residual paint-film-decomposing agent, it is preferable to depressurize the recycling system by using a vacuum apparatus in order to facilitate the evaporation and removal of the decomposed products and the residual paint-film-decomposing agent. Note that the evaporated decomposed products and residual paint-film-decomposing agent can be cooled and collected to recover and re-use as the paint-film-decomposing agent.

In the present recycling process, the thermoplastic resin covered with the thermosetting-resin paint film is brought into contact with the paint-film-decomposing agent, and kneaded therewith in a molten state. The paint-film-decomposing agent can include at least one constituent member selected from the group consisting of the primary amines and secondary amines, or can include water and/or the alcohols in addition to at least one constituent member selected from the group consisting of the tertiary amines and quaternar ammonium compounds. The paint-film-decomposing agent cuts the bonds in the thermosetting-resin paint film by means of the aminolysis reactions which result from the constituent amines, or by means of the alcoholysis or hydrolysis reactions which stem from the ions activated by the nucleophilic-catalytic actions of the constituent members. In addition, the kneader can act on the paint film to mechanically decompose and pulverize the paint film into fine pieces. Thus, even when the paint film resides in the recycled resin, thus decomposed and pulverized paint film does not adversely affect the physical properties of molded products resulted from the recycled resin nor the subsequent processing operations.

In the present recycling process, the paint-film-decomposing agent exhibits a high decomposing ability against the thermosetting-resin paint film, and can decompose the thermosetting-resin paint film at relatively low temperatures at a fast rate. Accordingly, the recycled resin is little affected from the decomposing activity, that is scarcely subjected to excessive heat, and can be effectively inhibited from thermally degrading. Thus, the recycled resin can keep qualities which are virtually identical to those of the virgin resin. In addition, the constituent members of the paint-film-decomposing agent have a boiling point of 250° C. or less, or are decomposable at 250° C. or less. Consequently, the paint-film-decomposing agent can be removed from the recycled resin by degassification with ease. As a result, the recycled resin is free from the drawbacks resulting from the residual paint-film-decomposing agent.

Note that, in the present recycling process, the paint-film-decomposing agent is added in a specific total amount with respect to the thermoplastic resin covered with the thermosetting-resin paint film. Thus, the paint-film-decomposing agent can be removed by degassification relatively easily in a short period of time.

In accordance with the present recycling process, the recycled resin can be substantially free from the residual paint-film-decomposing agent. Even when foreign materials exist on the surface of the recycled resin, such foreign materials are micro-fine pieces which have a size of 100 μm or less. Accordingly, the recycled resin has good paintability. Moreover, the recycled resin has mechanical properties as good as those of the virgin resin. All in all, the recycled resin can be recovered to a raw material, for example, for molding vehicle bumpers, and the other resin-molded products.

In addition, the present recycling process can be carried out repeatedly, and accordingly can contribute to energy saving and manpower saving.

BRIEF DESCRIPTION OF THE DRAWING

A more complete appreciation of the present invention and many of its advantages will be readily obtained as the same becomes better understood by reference to the following detailed description when considered in connection with the accompanying drawing and detailed specification, all of which forms a part of the disclosure.

DETAILED DESCRIPTION OF THE PREFERRED EMBODIMENTS

Figure 1:
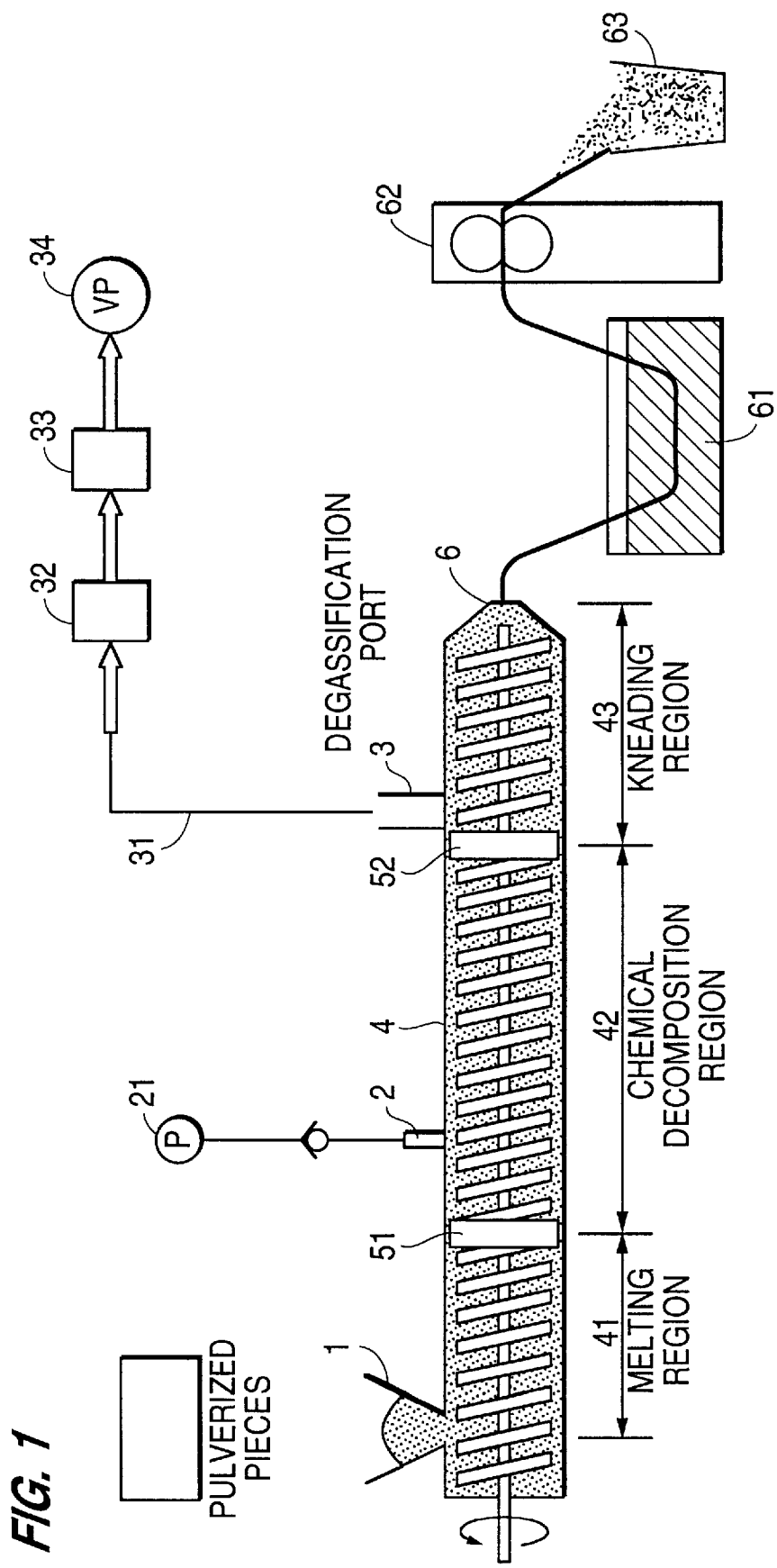
FIG. 1 is a schematic diagram for illustrating an apparatus to carry out preferred embodiments of a recycling process according to the present invention.

Having generally described the present invention, a further understanding can be obtained by reference to the specific preferred embodiments which are provided herein for the purpose of illustration only and not intended to limit the scope of the appended claims.

In the first aspect, note that, in addition to the primary amines and/or the secondary amines, at least one member selected from the group consisting of water and alcohols can be further included in the paint-film-decomposing agent. With water and alcohols, the paint-film-decomposing agent is highly likely to impregnate into the thermosetting resin constituting the paint film, and to increase the pressure in a kneader. As a result, the paint film can be decomposed at much better efficiency.

The following amines can be exemplified as the primary amines; namely: methylamine, ethylamine, propylamine, isopropylamine, butylamine, isobutylamine, sec-butylamine, tert-butylamine, ethylenediamine, propylenediamine, butylenediamine, and dimethylaminopropylamine. In addition, the following alcohol-modified amines can be also exemplified as the primary amines; namely: ethanolamine, propanolamine, and butanolamine. The following amines can be exemplified as the secondary amines; namely: dimethylamine, and diethylamine. Note that the primary amines and secondary amines have a boiling point of 250° C. or less, preferably from 60° to 150° C., or that they are decomposable at 250° C. or less, preferably from 100° to 200° C. It is possible to select a single independent amine from the primary amines and secondary amines, or to combine two or more amines selected from the primary amines and secondary amines to constitute the paint-film-decomposing agent. Among the primary amines and secondary amines, it is preferable to use primary amines having a boiling point of 150° C. or less, preferably from 60° to 120° C., because such primary amines can produce the advantageous effects of the present invention remarkably. For example, the ethylenediamine has a boiling point of 116° C., is likely to be removed by degassification, and decompose the paint film most effectively. Hence, it is most preferable to employ the ethylenediamine as the paint-film-decomposing agent.

The following alcohols can be added to the primary amines and secondary amines; namely: methanol, ethanol, propanol, iso-propanol, butanol, iso-butylalcohol, sec-butylalcohol, tert-butylalcohol, ethylene glycol, methylcellosolve, ethylcellosolve, propylcellosolve, butylcellosolve, and 1-methoxy-2-propanol. Note that the alcohols have a boiling point of 250° C. or less, preferably from 60° to 150° C., or that they are decomposable at 250° C. or less, preferably from 100° to 200° C. It is possible to select a single independent alcohol from the alcohols, or to combine two or more alcohols selected from the alcohols. Among the alcohols, it is especially preferable to use the ethylcellosolve, because the ethylcellosolve has a boiling point of 135° C., and because it contributes to the decomposition of the paint film greatly. It is preferred that, in the first aspect of the present invention, the primary amines and/or secondary amines, and water and/or the alcohols are prepared in a summed amount of 50 parts by weight or less, further preferably from 2 to 10 parts by weight, with respect to 100 parts by weight of the thermoplastic resin covered with the thermosetting-resin paint film.

When at least one amine selected from the group consisting of the primary amines and secondary amines is solely used as in the first aspect of the present invention, the paint-film-decomposing agent is added in a total amount of from 1.5 to 50 parts by weight, further preferably from 2 to 10 parts by weight, with respect to 100 parts by weight of the thermoplastic resin covered with the thermosetting-resin paint film. In other words, it is preferred that the primary amines and/or the secondary amines is employed together with water and/or the alcohols, whilst the primary amines and/or the secondary amines may be solely employed. Note that, in the former case, the primary amines and/or the secondary amines, and water and/or the alcohols are added in a total amount of from 1.5 to 50 parts by weight with respect to 100 parts by weight of the thermoplastic resin covered with the thermosetting-resin paint film, and that, in the latter case, the primary amines and/or the secondary amines can be used in an amount of from 1.5 to 50 parts by weight with respect to 100 parts by weight of the thermoplastic resin covered with the thermosetting-resin paint film.

When the paint-film-decomposing agent is added in a total amount of less than the lower limit, the paint-film-decomposing agent is less likely to diffuse into the thermosetting resin constituting the paint film, and decompose the paint film at an improper decomposition rate. When the paint-film-decomposing agent is added in a total amount of more than the upper limit, it takes longer to remove the paint-film-decomposing agent from the system by degassification. Thus, in both cases, the recycling process cannot produce desirable cost-reduction merit.

In the second aspect, the following amines can be exemplified as the tertiary amines; namely: trimethylamine, triethylamine, tripropylamine, N, N, N', N'-tetramethylethylenediamine, N, N, N', N'-tetramethylpropyldiamine, N, N, N', N'-tetramethylhexamethylenediamine, N, N, N', N', N''-pentamethyldiethylenetriamine, N-methylmorpholine, N-ethylmorpholine, triethylenediamine, N, N-dimethylbenzylamine, dimethylethanolamine, dimethylaminopropylamine, and N, N, N', N'-tetramethyldiethylenetriamine. The following compounds can be exemplified as the quaternary ammonium compounds; namely: tetramethylammonium hydroxide, tetraethylammonium hydroxide, and tetrapropylammonium hydroxide. Note that the tertiary amines and quaternary ammonium compounds have a boiling point of 250° C. or less, preferably from 60° to 150° C., or that they are decomposable at 250° C. or less, preferably from 100° to 200° C. It is possible to independently select a single tertiary amine or quaternary ammonium compound, or to combine two or more tertiary amines and/or quaternary ammonium compounds to constitute the paint-film-decomposing agent.

The alcohols used together with the tertiary amines and/or quaternary ammonium compounds can be identical with those used in the first aspect of the present invention.

In the second aspect of the present invention, i.e., when at least one member selected from the group consisting of the tertiary amines and quaternary ammonium compounds is used together with at least one member selected from the group consisting of water and the alcohols as a paint-film-decomposing agent, the tertiary amines and/or quaternary ammonium compounds is preferably added in an amount of from 1.5 to 10 parts by weight with respect to 100 parts by weight of the thermoplastic resin covered with the thermosetting-resin paint film.

When the tertiary amines and/or quaternary ammonium compounds are used in an amount of less than the lower limit, the paint-film-decomposing agent effects its catalytic action inadequately. When the tertiary amines and/or quaternary ammonium compounds are used in an amount of more than the upper limit, the paint-film-decomposing agent little produces significant advantageous effects.

When the paint-film-decomposing agent is added in a total amount of less than 2.0 parts by weight with respect to 100 parts by weight of the thermoplastic resin covered with the thermosetting-resin paint film, the paint-film-decomposing agent is less likely to diffuse into the thermosetting resin constituting the paint film, and decompose the paint film at an improper decomposition rate. When the paint-film-decomposing agent is added in a total amount of more than 50 parts by weight with respect to 100 parts by weight of the thermoplastic resin covered with the thermosetting-resin paint film, it takes longer to remove the paint-film-decomposing agent from the system by degassification. Thus, in both cases, the recycling process cannot produce desirable cost-reduction merit.

The present recycling process can recycle a thermoplastic resin covered with a thermosetting-resin paint film. The thermosetting-resin paint film includes an alkyl-melamine-based thermosetting resin, an acrylic-melamine-based thermosetting resin, and a polyurethane-based thermosetting resin. In addition to the thermosetting-resin paint film, the present recycling process can recycle such a putty for repairing as the following thermosetting resins; namely: an ester-based thermosetting resin, a polyurethane-based thermosetting resin, and an epoxy-based thermosetting resin. The thermoplastic resin includes polypropylene, elastomer-modified polypropylene, polyethylene, an ABS resin, an AS resin, a polyamide resin, and a poylacetal resin. Note that the present recycling process is not adversely affected by the additives, such as fillers, pigments, glass fibers, etc., which are usually compounded in paint films and thermoplastic-resin molded products.

The thermoplastic resin covered with the thermosetting-resin paint film can be brought into contact with the paint-film-decomposing agent to decompose the paint film by using a kneader. The kneader can be an extruder which can knead the paint-film-covered thermoplastic resin and the paint-film-decomposing agent mechanically in a conventional manner. When kneading the paint-film-covered thermoplastic resin and the paint-film-decomposing agent, it is preferable to facilitate the decomposition of the paint film by means of thermal agitation which is effected by heating the paint-film-covered thermoplastic resin and the paint-film-decomposing agent simultaneously. In particular, in order to effectively diffuse the paint-film-decomposing agent into the thermosetting resin constituting the paint film, it is preferable to heat the paint-film-covered thermoplastic resin and the paint-film-decomposing agent to a high temperature of the boiling point or more of the constituent members of the paint-film-decomposing agent. Note that it is effective to apply a high pressure to the paint-film-decomposing agent so that the paint-film-covered thermoplastic resin and the paint-film-decomposing agent can be kept in a fluid sate in the kneader. The actions of the kneader exert shearing forces to the paint film. The shearing forces can mechanically pulverize the paint film so as to facilitate the operations of the paint-film-decomposing agent. An optimum time for decomposing the paint film with the paint-film-decomposing agent depends greatly on the species of the paint film, the specific constituent members and the amount of the paint-film-decomposing agent, and the heating temperature. For example, when a single-axis or dual-axis extruder is used as the kneader, it is usually preferable to specify the constituent members of the paint-film-decomposing agent and the heating temperature so that the paint film is decomposed to pieces of 100 $\mu$m or less in size for a time period of from about 1.5 to 5 minutes.

When an ordinary extruder is used as the kneader, the decomposed products, resulting from the paint film and the paint-film-decomposing agent, and the residual paint-film-decomposing agent obtained by reactions which occur in a cylinder-shaped chamber are turned into gases. The gases are taken out of the cylinder-shaped chamber through an outlet hole formed on a nozzle side of the extruder, and then transferred to a cooling apparatus through a pipe communicating between the outlet hole and the cooling apparatus. Thus, the decomposed products and paint-film-decomposing agent can be collected as liquid, and accordingly the paint-film-decomposing agent can be recovered.

The thermoplastic resin whose paint film is decomposed and separated is taken out as a recycled thermoplastic resin through a nozzle of an extruder. It is possible, for example, to extrude the recycled thermoplastic resin in a rod shape, and to cut the rod-shaped-extruded substance to pelletize. Thus, the recycled thermoplastic resin can be used as a raw material for molding. In addition, it is possible to extrude the recycled thermoplastic resin directly into a secondary product, such as a sheet, which has a predetermined cross-section.

It is possible to compound additives, such as pigments, fillers, etc. with pulverized pieces of the thermoplastic resin covered with the paint film in order to prepare recycled thermoplastic resins whose color and physical properties conform to specific applications. For example, when a pigment is compounded with pulverized pieces of the thermoplastic resin covered with the paint film, it is possible to color the resulting recycled thermoplastic resin. Accordingly, it is possible to reduce processing costs, because no coloring process is required after the present recycling process. The pigment to be compounded with the recycled thermoplastic resin can be prepared by appropriately mixing from 3 to 8 specific pigments which are selected from the group consisting of titanium oxide, an iron red, a cyanine blue, a titanellow, a titanium white, a carbon black, and an ultra-marine blue.

FIG. 1 schematically illustrates a recycling apparatus which were used in the preferred embodiments of a recycling process according to the present invention. This recycling apparatus is a dual-axis kneading extruder whose screw has an L/D of 54. The extruder is provided with a metering hopper 1, an inlet port 2, and a degassification port 3. Through the metering hopper 1, a thermoplastic-resin covered with a paint film which are pulverized into pieces are supplied. Through the inlet port 2, a paint-film-decomposing agent is supplied. Through the degassification port 3, the residual paint-film-decomposing agent, and volatile products are removed. Further, the extruder is provided with a cylinder 4. As illustrated in FIG. 1, the cylinder 4 is divided into a melting region 41, a chemical decomposition region 42, and a kneading region 43 by a first sealing ring 51 and a second sealing ring 52. Note that the first sealing ring 51 is provided with a 40-mesh screen, and the second sealing ring 52 is provided with a 300-mesh screen. The inlet port 2 is disposed on an upstream side of the chemical decomposition region 42. The degassification port 3 is disposed on a downstream side with respect to the chemical decomposition region 42 and on an upstream side of the kneading region 43. The inlet port 2 is connected with a charging pump 21. The degassification port 3 is connected with a pipe 31 which communicates with a vacuum pump 34 by way of a primary cooling collector 32 and a secondary cooling collector 33. A nozzle 6 is disposed on the leading end of the extruder. The recycled resin extruded through the nozzle 6 is transferred to a storage tray 63 by way of a water tank 61 and a cutter 62.

A thermoplastic resin covered with a thermosetting-resin paint film is pulverized to pieces having a size of about 10 mm×10 mm. The thus pulverized pieces are charged through the metering hopper 1 of the extruder. In the melting region 41 of the extruder, the pulverized pieces are heated, and subjected to the shearing frictional forces resulting from the rotation of the screw. Thus, the paint film and the thermoplastic-resin substrate of the pulverized pieces are further pulverized, melted, and kneaded, and are transferred to the subsequent chemical decomposition region 42 through the first sealing ring 51. When the pulverized pieces are transferred to the chemical decomposition region 42, a predetermined paint-film-decomposing agent is charged in a prescribed amount into the chemical decomposition region 42 through the inlet port 2 by the charging pump 21. In the chemical decomposition region 42 of the extruder, the kneaded pulverized pieces are mixed with the paint-film-decomposing agent, and the paint film of the pulverized pieces are decomposed chemically and mechanically at a fast rate by the paint-film-decomposing agent and the shearing forces resulting from the rotation of the screw. Thus, the paint film is turned into low-molecular-weight substances.

Note that the chemical decomposition region 42 is provided with the first sealing ring 51 and the second sealing ring 52 at the upstream side and the downstream side, respectively, that the screw has an L/D of from 30 to 55 in the chemical decomposition region 42, and that the cylinder 4 is pressurized in a range of from 10 to 100 kgf/cm$^2$ in the chemical decomposition region 42. As a result, the pulverized pieces can be heated and melted in a temperature range of from 200° to 300° C., preferably from 230° to 250° C. Thus, it is possible to chemically decompose the paint film of the pulverized pieces without thermally degrading the thermoplastic-resin substrate thereof Also note that the screw arrangement in the chemical decomposition region 42 can be replaced by a kneading disk or a geared kneading disk which enables to sufficiently diffuse the paint-film-decomposing agent into the thermosetting-resin paint film of the pulverized pieces.

The residual paint-film-decomposing agent and volatile decomposed products, which are present in the thermoplastic resin, are then transferred to the kneading region 43 through the 300-mesh second sealing ring 52, and vaporized and evacuated through the degassification port 3 in the kneading region 43. Note that the kneading region 43 is depressurized through the degassification port 3 by the vacuum pump 34. As a result, the residual paint-film-decomposing agent and volatile decomposed products can be vaporized and evacuated with ease.

The thus evacuated components can be trapped by a forced cooling collector which is disposed between the degassification port 3 and the vacuum pump 34. The forced cooling collector is constituted by the primary cooling collector 32 and secondary cooling collector 33 which can trap and re-use decomposed products having different boiling points by adjusting their cooling temperature differently. For instance, the kneading region 43 is depressurized to a pressure of from 500 to 700 mmHg by the vacuum pump 34. The primary cooling collector 32 is cooled to a temperature of 20° C. or less in order to carry out a first cooling-and-trapping of the evacuated components. The secondary cooling collector 33 is cooled to a temperature of 0° C. in order to carry out a second cooling-and-trapping of the residual components which cannot be collected by the first cooling-and-trapping. The secondary cooling collector 33 thus operates as a cold trap. The thus collected evacuated components can be re-used as a paint-film-decomposing agent with appropriate adjustment of the concentrations of the components.

In the kneading region 43, the molten thermoplastic resin from which the decomposed products and the residual paint-film-decomposing agent are removed is further kneaded, and is transferred to the nozzle 6. The molten thermoplastic resin is then extruded through the nozzle 6 as a strand, is cooled by the water tank 61, and is cut by the cutter 62 to pelletize. Finally, the pelletized thermoplastic resin is stored in the storage tray 63.

First Preferred Embodiments

A used automobile bumper was prepared for subjecting to First Preferred Embodiments of the present recycling process. The automobile bumper comprised a thermoplastic-resin substrate, and a thermosetting-resin paint film covering the thermoplastic-resin substrate for repairing. The thermoplastic-resin substrate included polypropylene. The thermosetting-resin paint film included a polyurethane-based resin.

The used automobile bumper was first pulverized by a pulverizer into pieces having a size of about 10 mm×10 mm. The pulverized pieces were charged in the above-described dual-axis extruder. The pulverized pieces could be kneaded in a temperature range of from about 240° to 260° C., and could reside in the extruder for a total time period of 120 or 170 seconds. The thermoplastic resin was pelletized. The pulverized pieces could be processed by the extruder in an amount of from 80 to 120 kg/hr.

Table 1 below sets forth the specific recycling conditions. Note that the following paint-film-decomposing agents were charged independently into the extruder through the inlet port 2; namely: ethylenediamine in Example No. 1; ethylenediamine, and ethylcellosolve in Example No. 2; ethylenediamine, ethylcellosolve, and water in Example No. 3; and dimethylaminopropylamine (working as a nucleophilic catalyst), and ethylcellosolve in Example No. 4. In Comparative Example No. 1, however, only water was charged into the extruder through the inlet port 2.

TABLE 1

| Identi-fication | Recycling Amount (kg/hr) | Temp. (°C.) | Pressure in Extruder (kgf/cm$^2$) | Recycling Time (sec.) |
| --- | --- | --- | --- | --- |
| Ex. 1 | 115 | 240 | 28 | 120 |
| Ex. 2 | 115 | 245 | 28 | 120 |
| Ex. 3 | 115 | 245 | 30 | 120 |
| Ex. 4 | 115 | 260 | 31 | 120 |
| Comp. Ex. 1 | 115 | 250 | 30 | 120 |

Further, the pulverized pieces were recycled under the recycling conditions set forth in Table 1 above, respectively. The paint-film-decomposing agents were diversified as follows: 2 parts by weight with respect to 100 parts by weight of the pulverized pieces in Example No. 1-A; 6 parts by weight with respect to 100 parts by weight of the pulverized pieces in Example No. 1-B; 8 parts by weight with respect to 100 parts by weight of the pulverized pieces in Example No. 1-C; 6 parts by weight with respect to 100 parts by weight of the pulverized pieces in Example No. 2-A; 8 parts by weight with respect to 100 parts by weight of the pulverized pieces in Example No. 2-B; 6 parts by weight with respect to 100 parts by weight of the pulverized pieces in Example No. 3-A; 8 parts by weight with respect to 100 parts by weight of the pulverized pieces in Example No. 3-B; 6 parts by weight with respect to 100 parts by weight of the pulverized pieces in Example No. 3-C; and 20 parts by weight with respect to 100 parts by weight of the pulverized pieces in Example No. 4.

In Comparative Example No. 1, water was added in an amount of 20 parts by weight with respect to 100 parts by weight of the pulverized pieces. Table 2 summarizes the results of tests (e.g., on decomposability, physical properties and paintability) to which the recycled resins were subjected.

Note that, in Example Nos. 2-A and 2-B, ethylenediamine, and ethylcellosolve were mixed in a weight ratio of 70:30, and 50:50, respectively. In Example Nos. 3-A through 3-C, ethylenediamine, ethylcellosolve, and water were mixed in a weight ratio of 70:20:10, 70:20:10, and 70:10:20, respectively. In Example No. 4, dimethylaminopropylamine, and ethylcellosolve were mixed in a weight ratio of 20:80.

TABLE 2

| Identification | Decomposability | Physical Properties | Paintability |
|---|---|---|---|
| Ex. 1-A | ○ | ○ | ○ |
| Ex. 1-B | ○ | ○ | ○ |
| Ex. 1-C | ○ | ○ | ○ |
| Ex. 2-A | ○ | ○ | ○ |
| Ex. 2-B | ○ | ○ | ○ |
| Ex. 3-A | ○ | ○ | ○ |
| Ex. 3-B | ○ | ○ | ○ |
| Ex. 3-C | ○ | ○ | ○ |
| Ex. 4 | ○ | ○ | ○ |
| Comp. Ex. 1 | × | × | × |

The decomposability was evaluated in accordance with JIS Japanese Industrial Standard) K-6758. For instance, the resulting recycled resins were formed into a plate-shaped test specimen having a thickness of 2 mm by a press at 230° C. The plate-shaped test specimens were cut, and their cross-sections were observed by a microscope to measure an average particle diameter of the residual paint-film particles dispersed therein. In Table 2, ○ designates that the residual paint-film particles had an average particle diameter of 0.1 mm or less (i.e., 100 μm or less), Δ, from 0.2 to 0.4 mm (i.e., from 200 to 400 μm), and X, 0.5 mm or more (i.e., 500 μm or more).

The resulting recycled resins were examined for physical properties (e.g. embrittlement at low temperature, Izod impact strength, and MFR (i.e., melt flow rate). The low-temperature embrittlement temperature was evaluated in accordance with ASTM D746. In Table 2, ○ designates that the resulting recycled resin exhibited a low-temperature embrittlement temperature degraded by 15% or less with respect to that of the virgin resin, Δ designates that the resulting recycled resin exhibited a low-temperature embrittlement temperature degraded by from 15 to 30% with respect to that of the virgin resin, and X designates that the resulting recycled resin exhibited a low-temperature embrittlement temperature degraded by 30% or more with respect to that of the virgin resin.

The Izod impact strength was evaluated in accordance with JIS K7110. In Table 2, ○ designates that the resulting recycled resin exhibited an Izod impact strength degraded by 15% or less with respect to that of the virgin resin, Δ designates that the resulting recycled resin exhibited an Izod impact strength degraded by from 15 to 30% with respect to that of the virgin resin, and X designates that the resulting recycled resin exhibited an Izod impact strength degraded by 30% or more with respect to that of the virgin resin.

The MFR was evaluated in accordance with JIS K58; namely: the resulting recycled resins were extruded at 230° C. at a load of 2.1 kgf. In Table 2, ○ designates that the resulting recycled resin exhibited an MFR degraded by 10% or less with respect to that of the virgin resin, Δ designates that the resulting recycled resin exhibited an MFR degraded by from 10 to 15% with respect to that of the virgin resin, and X designates that the resulting recycled resin exhibited an MFR degraded by 15% or more with respect to that of the virgin resin.

The paintability was evaluated in accordance with JIS K6758 (i.e., an accelerated weather resistance test). In Table 2, ○ designates that the resulting recycled resin little suffered from peeling and yellowing, Δ, little suffered from peeling but underwent yellowing, and X, suffered from peeling and yellowing.

Thus, it is apparent from Table 2 that the recycled resins exhibited satisfactory decomposability, physical properties and paintability when they are prepared by using the following paint-film-decomposing agents; namely: a secondary amine (e.g., Example Nos. 1-A through 1-C); the combination of a secondary amine and an alcohol (e.g., Example Nos. 2-A and 2-B); the combination of a secondary amine and an alcohol and water (e.g., Example Nos. 3-A through 3-C); and the combination of a tertiary amine (working as a nucleophilic catalyst) and an alcohol (e.g., Example No. 4). Hence, the present recycling process was verified to be effective in recycling a thermoplastic resin covered with a thermosetting-resin paint film.

In view of the decomposability and paintability, the recycled resins prepared by the First Preferred Embodiments of the present recycling process had foreign materials (or paint film particles) having an average particle diameter of 100 μm or less (i.e., 0.1 mm or less) on their surface, and accordingly they exhibited good paintability. In view of the physical properties, they had satisfactory physical properties. As a result, they could be used as a raw material of polypropylene-based composite for automobile bumpers, or a raw material of other resin-molded products.

Moreover, the recycled polypropylene resins prepared by the First Preferred Embodiments of the present recycling process were subjected to gas chromatography to examine the residual amines which were the major component of the paint-film-decomposing agent and resided in them. According to the analysis, all of the recycled polypropylene resins prepared by the First Preferred Embodiments included the residual amines in an amount of 0.1% by weight or less.

In order to examine how the physical properties of the recycled resin depended on the total addition amount of the paint-film-decomposing agent (e.g., ethylenediamine, alcohol and water), the total addition amount was diversified as set forth in Table 3 below, and the above-described recycling process was carried out again in a processing amount of 115 kg/hour.

Note that the combination of ethylenediamine, ethylcellosolve and water was in a fixed weight ratio of 70:20:10. The combination was diversified in total amount as follows: 2 parts by weight with respect to 100 parts by weight of the pulverized pieces in Example No. 3-D; 4 parts by weight, in Example No. 3-E; 6 parts by weight, in Example No. 3-F; and 0.8 parts by weight, in Comparative Example No. 4. Note that a virgin polypropylene-based resin was examined for the physical properties in Comparative Example No. 2, and that the pulverized pieces resulting from the used automobile bumper were simply melted and kneaded in Comparative Example No. 3.

TABLE 3

| | Ex. 3-D | Ex. 3-E | Ex. 3-F | Comp. Ex. 2 | Comp. Ex. 3 | Comp. Ex. 4 |
|---|---|---|---|---|---|---|
| Recycling Conditions: | | | | | | |
| Recycling Temp. (°C.) | 250 | 250 | 250 | — | 250 | 250 |
| Recycling Time (sec.) | 120 | 120 | 120 | — | 120 | 120 |
| Addition Amount (parts by weight) | 2 | 4 | 6 | — | 0 | 0.8 |
| Physical Properties: | | | | | | |
| Low-Temp. Embrittlement Temp. (°C.) | −35 | −36 | −36 | −40 | room temp. | −5 |
| Izod Impact Strength at 23° C. (J/m) | 430 | 435 | 435 | 450 | 200 | 250 |

TABLE 3-continued

|  | Ex. 3-D | Ex. 3-E | Ex. 3-F | Comp. Ex. 2 | Comp. Ex. 3 | Comp. Ex. 4 |
|---|---|---|---|---|---|---|
| Izod Impact Strength at −23° C. (J/m) | 60 | 62 | 63 | 65 | 20 | 25 |
| MFR (g/10-min.) | 20 | 19 | 19 | 18 | 20 | 20 |
| Overall Evaluation | good | good | good | good | poor | poor |

In Comparative Example No. 3, the pulverized pieces resulting from the used automobile bumper were simply melted and kneaded, and accordingly the resulting recycled resin had the coarse paint-film particles having an average particle diameter of from 1,000 to 2,000 μm (i.e., from 1 to 2 mm) and the undecomposed repairing putty therein, which become a starting point of the fractures. That may be why the resulting recycled resin in Comparative Example No. 3 exhibited a low-temperature embrittlement temperature and Izod impact strengths which were degraded considerably with respect to those of the virgin resin (i.e., Comparative Example No. 2).

In Comparative Example No. 4, the combination of ethylenediamine, ethylcellosolve and water was added in a total amount as small as 0.8 parts by weight with respect to 100 parts by weight of the pulverized pieces, and consequently the thermosetting resin constituting the paint film was decomposed inadequately. The recycled resin prepared by Comparative Example No. 4 was thus exhibited an elevated low-temperature embrittlement temperature, and reduced Izod impact strengths.

On the other hand, when the combination was added in a total amount 2 parts by weight or more with respect to 100 parts by weight of the pulverized pieces (eg., Example Nos. 3-D through 3-F), the resulting recycled resins exhibited a low-temperature embrittlement temperature, Izod impact strengths, and an MFR which were substantially equivalent to those of the virgin resin (i.e., Comparative Example No. 2).

In order to further examine how the physical properties of the recycled resin depended on the addition amount of the paint-film-decomposing agent including a secondary amine only, the addition amount was diversified as set forth in Table 4 below, and the above-described recycling process was carried out again in a processing amount of 115 kg/hour. The paint-film-decomposing agent included ethylenediamine.

Note that the paint-film-decomposing agent was diversified in amount as follows: 2 parts by weight with respect to 100 parts by weight of the pulverized pieces in Example No. 1-D; 4 parts by weight, in Example No. 1-E; and 1 part by weight, in Comparative Example No. 5.

TABLE 4

|  | Ex. 1-D | Ex. 1-E | Comp. Ex. 5 |
|---|---|---|---|
| Recycling Conditions: |  |  |  |
| Recycling Temp. (°C.) | 250 | 250 | 250 |
| Recycling Time (sec.) | 170 | 170 | 170 |
| Addition Amount (parts by weight) | 2 | 4 | 1 |
| Physical Properties: |  |  |  |
| Low-Temp. Embrittlement Temp. (°C.) | −32 | −33 | −3 |
| Izod Impact Strength at 23° C. (J/m) | 430 | 440 | 220 |
| Izod Impact Strength at −23° C. (J/m) | 63 | 64 | 27 |
| MFR (g/10-min.) | 19 | 19 | 19 |
| Overall Evaluation | good | good | poor |

It is appreciated from Table 4 that, when the paint-film-decomposing agent was added in an amount of 2 parts by weight or more with respect to the pulverized pieces as in Example Nos. 1-D and 1-F, the resulting recycled resins exhibited the physical properties which were substantially equivalent to those of the virgin resin.

In order to furthermore examine how the physical properties of the recycled resin depended on the total addition amount of the paint-film-decomposing agent (e.g., dimethylaminopropylamine, and ethylcellosolve), the total addition amount was diversified as set forth in Table 5 below, and the above-described recycling process was carried out again in a processing amount of 85 kg/hour.

Note that the combination of dimethylaminopropylamine (working as a nucleophilic catalyst) and ethylcellosolve was in a fixed weight ratio of 20:80. The combination of the paint-film-decomposing agent was diversified in total amount as follows: 2 parts by weight with respect to 100 parts by weight of the pulverized pieces in Example No. 4-A; 4 parts by weight, in Example No. 4-B; and 1 part by weight, in Comparative Example No. 6.

TABLE 5

|  | Ex. 4-A | Ex. 4-B | Comp. Ex. 6 |
|---|---|---|---|
| Recycling Conditions: |  |  |  |
| Recycling Temp. (°C.) | 250 | 250 | 250 |
| Recycling Time (sec.) | 170 | 170 | 170 |
| Addition Amount (parts by weight) | 2 | 4 | 1 |
| Physical Properties: |  |  |  |
| Low-Temp. Embrittlement Temp. (°C.) | −32 | −33 | −3 |
| Izod Impact Strength at 23° C. (J/m) | 410 | 410 | 220 |
| Izod Impact Strength at −23° C. (J/m) | 61 | 61 | 23 |
| MFR (g/10-min.) | 19.5 | 19 | 19 |
| Overall Evaluation | good | good | poor |

It is appreciated from Table 5 that the recycled resin prepared by Comparative Example No. 6 exhibited the unsatisfactory physical properties because it was recycled by using the paint-film-decomposing agent in a total amount of 1 part by weight with respect to 100 parts by weight of the pulverized pieces. On the other hand, when the recycled resins were prepared by using the paint-film-decomposing agent in a total amount of 2 parts by weight or more with respect to 100 parts by weight of the pulverized pieces as in Example Nos. 4-A and 4-B, they exhibited the physical properties which were substantially equivalent to those of the virgin resin.

Second Preferred Embodiments

A used automobile bumper was prepared for subjecting to Second Preferred Embodiments of the present recycling process. The automobile bumper comprised a thermoplastic-resin substrate covered with a thermosetting-resin paint film for repairing. The thermoplastic-resin substrate included polypropylene. Unlike the polyurethane-based-resin paint film decomposed by the First Preferred Embodiments, the thermosetting-resin paint film included a nielamine resin.

The used automobile bumper was first pulverized by a pulverizer to pieces having a size of about 10 mm×10 mm. The pulverized pieces were charged into the above-described dual-axis extruder. The pulverized pieces were melted and kneaded in a temperature range of from about 230° to 245° C., and could reside in the extruder for a total time period of 120 seconds. The thus recycled thermoplastic resin was pelletized. The pulverized pieces could be processed by the extruder in an amount of 115 kg/hr.

Table 6 below sets forth the specific recycling conditions. Note that the following paint-film-decomposing agents were charged independently into the extruder through the inlet port 2; namely: ethylenediamine in Example No. 5; and ethylenediamine, ethylcellosolve, and water in Example No. 6.

TABLE 6

| Identi-fication | Recycling Amount (kg/hr) | Recycling Temp. (°C.) | Pressure in Extruder (kgf/m$^2$) | Recycling Time (sec.) |
|---|---|---|---|---|
| Ex. 5 | 115 | 230 | 30 | 120 |
| Ex. 6 | 115 | 245 | 30 | 120 |

Note that, in Example No. 5, ethylenediamine was added in an amount of 6 parts by weight with respect to 100 parts by weight of the pulverized pieces; and, in Example No. 6, the combination of ethylenediamine, ethylcellosolve and water was added in an amount of 4.2 parts by weight with respect to 100 parts by weight of the pulverized pieces, and the combination of ethylenediamine, ethylcellosolve and water in a weight ratio of 70:20:10.

The resulting recycled resins were examined for the decomposability, physical properties and paintability as described above. Table 7 below summarizes the test results.

TABLE 7

| Identification | Decomposability | Physical Properties | Paintability |
|---|---|---|---|
| Ex. 5 | ○ | ○ | ○ |
| Ex. 6 | ○ | ○ | ○ |

In view of the decomposability and paintability, the recycled resins prepared by the Second Preferred Embodiments of the present recycling process had foreign materials (or paint film particles) having an average particle diameter of 100 μm or less (i.e., 0.1 mm or less) on their surface, and accordingly they exhibited good paintability. In view of the physical properties, they had satisfactory physical properties. As a result, they could be used as a raw material of polypropylene-based composites for preparing automobile bumpers, or a raw material of other resin-molded products.

Moreover, the recycled resins prepared by the Second Preferred Embodiments of the present recycling process were subjected to gas chromatography to examine the residual ethylenediamine. According to the analysis, all of the recycled resins prepared by the Second Preferred Embodiments included the residual ethylenediamine in an amount of 0.1% by weight or less.

In order to examine how the physical properties of the recycled resin depended on the total addition amount of the paint-film-decomposing agent (e.g., ethylenediamine, ethylcellosolve, and water), the total addition amount was diversified as set forth in Table 8 below, and the above-described recycling process was carried out again in a processing amount of 115 kg/hour.

Note that, as in Example No. 6, the combination of ethylenediamine, ethylcellosolve and water was in a fixed weight ratio of 70:20:10. The combination was diversified in total amount as follows: 4 parts by weight with respect to 100 parts by weight of the pulverized pieces in Example No. 6-A; and 6 parts by weight, in Example No. 6-B. Note that, however, a virgin polypropylene-based resin was examined for the physical properties in Comparative Example No. 7.

The resulting recycled resins were examined for the decomposability, physical properties and paintability as described above. Table 8 below summarizes the test results.

TABLE 8

| | Ex. 6-A | Ex. 6-B | Comp. Ex. 7 |
|---|---|---|---|
| Recycling Conditions: | | | |
| Recycling Temp. (°C.) | 250 | 245 | — |
| Recycling Time (sec.) | 120 | 120 | — |
| Addition Amount (parts by weight) | 4 | 6 | — |
| Physical Properties: | | | |
| Low-Temp. Embrittlement Temp. (°C.) | −35 | −36 | −40 |
| Izod Impact Strength at 23° C. (J/m) | 437 | 440 | 450 |
| Izod Impact Strength at −23° C. (J/m) | 63 | 63 | 65 |
| MFR (g/10-min.) | 20 | 19.5 | 18 |
| Overall Evaluation | good | good | good |

It is understood from Table 8 that, when the recycled resins were prepared by using the combination of ethylenediamine and alcohol and/or water in a total amount of 4 parts by weight and 6 parts by weight respect to 100 parts by weight of the pulverized pieces, respectively, in Example Nos. 6-A and 6-B, they exhibited the low-temperature embrittlement temperature, the Izod impact strengths, and the MFR which were substantially equivalent to those of the virgin resin (i.e., Comparative Example No. 7).

Having now fully described the present invention, it will be apparent to one of ordinary skill in the art that many changes and modifications can be made thereto without departing from the spirit or scope of the present invention as set forth herein including the appended claims.

What is claimed is:

1. A process for recycling a resin covered with a paint film, comprising the steps of:

decomposing a paint film of a thermosetting resin by bringing 100 parts by weight of a molten thermoplastic resin covered with the paint film into contact with from 1.5 to 50 parts by weight of a paint-film-decomposing agent, the paint-film-decomposing agent comprising at least one member selected from the group consisting of a primary amine and a secondary amine, the primary amine and secondary amine having a boiling point of 250° C. or less, or being decomposed at 250° C. or less; and then removing said decomposed paint film, and said paint-film-decomposing agent or said decomposed paint-film-decomposing agent by degassification, thereby preparing a recycled resin.

2. The process according to claim 1, wherein said paint-film-decomposing agent further comprises at least one member selected from the group consisting of water and an alcohol.

3. The process according to claim 1, wherein said primary amine is at least one selected from the group consisting of methylamine, ethylamine, propylamine, isopropylamine, butylamine, isobutylamine, sec-butylamine, tert-butylamine, ethylenediamine, propylenediamine, butylenediamine, dimethylaminopropylamine, ethanolamine, propanolamine, and butanolamine.

4. The process according to claim 1, wherein said primary amine has a boiling point of 150° C. or less.

5. The process according to claim 4, wherein said primary amine is ethylenediamine.

6. The process according to claim 1, wherein said secondary amine is at least one selected from the group consisting of dimethylamine, and diethylamine.

7. The process according to claim 2, wherein said alcohol is at least one selected from the group consisting of methanol, ethanol, propanol, iso-propanol, butanol, isobutylalcohol, sec-butylalcohol, tert-butylalcohol, ethylene glycol, methylcellosolve, ethylcellosolve, propylcellosolve, butylcellosolve, and 1-methoxy-2-propanol.

8. The process according to claim 7, wherein said alcohol includes ethylcellosolve.

9. The process according to claim 1, wherein said decomposing and removing steps are carried out in a kneader for decomposing said paint film to pieces of 100 μm or less in size for a time period of from about 1.5 to 5 minutes.

10. The process according to claim 1, wherein said decomposing step is carried out under a pressure of from 10 to 100 kgf/cm$^2$.

11. The process according to claim 1, wherein said decomposing step is carried out in a temperature range of from 200° to 300° C.

12. The process according to claim 1, wherein said thermoplastic resin includes at least one resin selected from the group consisting of polypropylene, elastomer-modified polypropylene, polyethylene, an ABS resin, an AS resin, a polyamide resin, and a poylacetal resin.

13. The process according to claim 1, wherein said thermosetting resin includes at least one resin selected from the group consisting of an alkylic-melamine-based thermosetting resin, an acrylic-melamine-based thermosetting resin, a polyurethane-based thermosetting resin, an ester-based thermosetting resin, and an epoxy-based thermosetting resin.

14. A process for recycling a resin covered with a paint film, comprising the steps of:
decomposing a paint film of a thermosetting resin by bringing 100 parts by weight of a molten thermoplastic resin covered with the paint film into contact with a paint-film-decomposing agent, the paint-film-decomposing agent comprising 1.5 to 10 parts by weight of at least one member selected from the group consisting of a tertiary amine and a quaternary ammonium compound, the tertiary amine and quaternary ammonium compound having a boiling point of 250° C. or less, or being decomposed at 250° C. or less, and 0.5 to 40 parts by weight of at least one member selected from the group consisting of water and an alcohol; and then
removing said decomposed paint film, and said paint-film-decomposing agent or said decomposed paint-film-decomposing agent by degassification, thereby preparing a recycled resin.

15. The process according to claim 14, wherein said tertiary amine is at least one selected from the group consisting of trimethylamine, triethylamine, tripropylamine, N, N, N', N'-tetramethylethylenediamine, N, N, N', N'-tetramethylpropyldiamine, N, N, N', N'-tetramethylhexamethylenediamine, N, N, N', N', N''-pentamethyldiethylenetriamine, N-methylmorpholine, N-ethylmorpholine, triethylenediamine, N, N-dimethylbenzylamine, dimethylethanolamine, dimethylaminopropylamine, and N, N, N', N'-tetramethyldiethylenetriamine.

16. The process according to claim 15, wherein said tertiary amine includes dimethylaminopropylamine.

17. The process according to claim 14, wherein said quaternary ammonium compound is at least one selected from the group consisting of tetramethylammonium hydroxide, tetraethylammonium hydroxide, and tetrapropylammonium hydroxide.

18. The process according to claim 14, wherein said alcohol is at least one selected from the group consisting of methanol, ethanol, propanol, iso-propanol, butanol, isobutylalcohol, sec-butylalcohol, tert-butylalcohol, ethylene glycol, methylcellosolve, ethylcellosolve, propylcellosolve, butylcellosolve, and 1-methoxy-2-propanol.

19. The process according to claim 18, wherein said alcohol includes ethylcellosolve.

20. The process according to claim 14, wherein said decomposing and removing steps are carried out in a kneader for decomposing said paint film to pieces of 100 μm or less in size for a time period of from about 1.5 to 5 minutes.

21. The process according to claim 14, wherein said decomposing step is carried out under a pressure of from 10 to 100 kgf/cm$^2$.

22. The process according to claim 14, wherein said decomposing step is carried out in a temperature range of from 200° to 300° C.

23. The process according to claim 14, wherein said thermoplastic resin includes at least one resin selected from the group consisting of polypropylene, elastomer-modified polypropylene, polyethylene, an ABS resin, an AS resin, a polyamide resin, and a poylacetal resin.

24. The process according to claim 14, wherein said thermosetting resin includes at least one resin selected from the group consisting of an alkylic-melamine-based thermosetting resin, an acrylic-melamine-based thermosetting resin, a polyurethane-based thermosetting resin, an ester-based thermosetting resin, and an epoxy-based thermosetting resin.

* * * * *

UNITED STATES PATENT AND TRADEMARK OFFICE
CERTIFICATE OF CORRECTION

PATENT NO.: 5,811,036

DATED: September 22, 1998

INVENTORS: Takahashi et al.

It is certified that an error appears in the above-identified patent and that said Letters Patent is hereby corrected as shown below:

Claim 13, column 17, line 45 and claim 24, column 18, line 54, "alkylic" should read as --alkyd--.

Signed and Sealed this

Eighth Day of June, 1999

*Attest:*

Q. TODD DICKINSON

*Attesting Officer*   Acting Commissioner of Patents and Trademarks